United States Patent
Snyder et al.

(10) Patent No.: US 11,277,317 B2
(45) Date of Patent: Mar. 15, 2022

(54) MACHINE LEARNING TO PREDICT QUALITY-OF-SERVICE NEEDS IN AN OPERATIONAL DATA MANAGEMENT SYSTEM

(71) Applicant: International Business Machines Corporation, Armonk, NY (US)

(72) Inventors: Jessica G. Snyder, Raleigh, NC (US); Thomas T. Hanis, Raleigh, NC (US); Paul J. Seifert, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/531,706

(22) Filed: Aug. 5, 2019

(65) Prior Publication Data
US 2021/0044496 A1     Feb. 11, 2021

(51) Int. Cl.
*H04L 12/24*     (2006.01)
*G06N 20/00*     (2019.01)
(Continued)

(52) U.S. Cl.
CPC ......... *H04L 41/5003* (2013.01); *G06N 20/00* (2019.01); *H04L 41/16* (2013.01); *H04L 47/821* (2013.01); *H04L 67/10* (2013.01)

(58) Field of Classification Search
CPC ..... H04L 67/12; H04L 1/0002; H04L 1/0041; H04L 1/18; H04L 5/0064; H04L 67/1097;
(Continued)

(56) References Cited

U.S. PATENT DOCUMENTS 7,756,989 B2    7/2010   Goldszmidt et al.
8,649,286 B2    2/2014   Saund et al.
(Continued)

FOREIGN PATENT DOCUMENTS

CN    102571752    7/2012
CN    103188168    7/2013
(Continued)

OTHER PUBLICATIONS

Amiri, Maryam, et al., "A Sequential Pattern Mining Model For Application Workload Prediction In Cloud Environment", J. of Network and Computer Applications, n. 105, pp. 21-62 (2018).
(Continued)

*Primary Examiner* — Djenane M Bayard
(74) *Attorney, Agent, or Firm* — Joseph P. Curcuru

(57) ABSTRACT

Operational data in a distributed processing system is managed by monitoring a workload of the system to establish a current assessment of operational data movement between data sources and data targets, receiving historical information on previous data movement including previous instances of movement resulting in a compromise of one or more quality-of-service criteria, determining from the current assessment and historical information that upcoming operational data actions will not meet a particular quality-of-service criterion, and responsively applying a data management optimization infrastructure (data backplane services) adapted to advance the particular quality-of-service criterion according to definitions for the data sources and data targets. The operational outcome is predicted using a cognitive system trained with historical information including historical operational factors correlated with historical operational outcomes relative to the quality-of-service criteria.

20 Claims, 6 Drawing Sheets

(51) Int. Cl.
*H04L 29/08* (2006.01)
*H04L 12/911* (2013.01)
*H04L 41/5003* (2022.01)
*H04L 41/16* (2022.01)
*H04L 67/10* (2022.01)
*H04L 47/70* (2022.01)

(58) Field of Classification Search
CPC ....... H04L 1/0009; H04L 47/70; H04L 63/10; H04L 67/10; H04L 41/5025; H04L 63/101; H04L 63/20; H04L 12/1407; H04L 12/4641; H04L 41/0896; H04L 41/16; H04L 41/5009; H04L 43/045; H04L 43/08; H04L 43/0876; H04L 63/06; H04L 67/02; H04L 67/04; H04L 67/20; H04L 67/2833; H04L 67/30; H04L 67/306; H04L 67/32; H04L 67/322; H04L 67/34; H04L 67/42; H04L 69/40; H04L 65/80; H04L 65/4084; H04L 65/4092; H04L 65/605; H04L 29/00; H04L 65/1063; H04L 65/1089; H04L 65/60; H04L 41/5022; H04L 1/002; H04L 1/0022; H04L 1/0025; H04L 45/16; H04L 47/14; H04L 65/00; H04L 67/18; H04L 67/2847; H04L 25/022; H04L 25/0232; H04L 27/2657; H04L 27/2695; H04L 65/1069; H04L 65/602; H04L 69/28; H04L 69/16; G06F 9/06; G06F 2209/5022; G06F 9/5083; G06F 9/5094
See application file for complete search history.

(56) References Cited

U.S. PATENT DOCUMENTS

| | | | |
|---|---|---|---|
| 8,856,023 | B2 | 10/2014 | Bantz et al. |
| 9,692,662 | B2 | 6/2017 | Chan et al. |
| 9,935,865 | B2 | 4/2018 | Ganesan et al. |
| 10,268,526 | B1 | 4/2019 | Martin |
| 2007/0119918 | A1 | 5/2007 | Hogg |
| 2008/0221941 | A1* | 9/2008 | Cherkasova ........ G06F 11/3414 718/106 |
| 2014/0280801 | A1* | 9/2014 | Cardona ............... H04L 47/127 709/221 |
| 2015/0039764 | A1* | 2/2015 | Beloglazov ........... G06F 9/5088 709/226 |
| 2015/0333969 | A1* | 11/2015 | Vasseur ............... H04L 41/5025 709/224 |
| 2016/0028599 | A1 | 1/2016 | Vasseur |
| 2016/0050151 | A1 | 2/2016 | Kim |
| 2017/0109205 | A1 | 4/2017 | Ahuja et al. |
| 2018/0352025 | A1* | 12/2018 | Anya ................... H04L 41/147 |
| 2019/0102717 | A1 | 4/2019 | Wu |
| 2019/0132256 | A1 | 5/2019 | Wada |
| 2020/0007408 | A1* | 1/2020 | Siddappa ............. H04L 41/147 |
| 2020/0050494 | A1 | 2/2020 | Bartfai-Walcott |

FOREIGN PATENT DOCUMENTS

| | | |
|---|---|---|
| CN | 105991667 | 10/2016 |
| CN | 106600058 A | 4/2017 |
| CN | 107404523 A | 11/2017 |
| CN | 109587217 A | 4/2019 |
| CN | 109634744 A | 4/2019 |
| EP | 3264268 A1 | 1/2018 |
| KR | 101630125 B1 | 6/2016 |
| WO | 0117169 | 3/2001 |
| WO | 201144396 | 4/2011 |
| WO | 2018065051 A1 | 4/2018 |
| WO | 2021024076 A1 | 2/2021 |
| WO | 2021024077 A1 | 2/2021 |

OTHER PUBLICATIONS

Islam, Sadeka, et al., "Empirical Prediction Models for Adaptive Resource Provisioning in the Cloud", Future Generation Computer Systems, v. 28, n. 1, pp. 155-162 (2011).
Florissi, Patrícia, "Quality of service management automation in integrated distributed systems", Abstract, Proc. 1994 Conf. of the Centre for Advanced Studies on Collaborative Research (Oct. 1994), [online], retrieved on Nov. 23, 2020 from the Internet URL: https://dl.acm.org/doi/10.5555/782185.782203.
Florissi, Patrícia, "Quality of service management automation in integrated distributed systems", Proc. 1994 Conf. of the Centre for Advanced Studies on Collaborative Research (Oct. 1994), [online], retrieved on Nov. 23, 2020 from the Internet URL: https://dl.acm.org/doi/10.5555/782185.782203.
WIPO, International Search Report & Written Opinion, Patent Cooperation Treaty Application No. IB2020/056958, dated Nov. 10, 2020.
List of IBM Patents or Patent Applications Treated as Related. Filed Herewith. 2 pages.
Snyder, et al., "Automated Operational Data Management Dictated By Quality-Of-Service Criteria", U.S. Appl. No. 16/531,664, filed Aug. 5, 2019.

* cited by examiner

MACHINE LEARNING TO PREDICT QUALITY-OF-SERVICE NEEDS IN AN OPERATIONAL DATA MANAGEMENT SYSTEM

CROSS-REFERENCE TO RELATED APPLICATION

This application is related to U.S. patent application Ser. No. 16/531,664 entitled "AUTOMATED OPERATIONAL DATA MANAGEMENT DICTATED BY QUALITY-OF-SERVICE CRITERIA" filed concurrently herewith, which is hereby incorporated.

BACKGROUND OF THE INVENTION

Field of the Invention

The present invention generally relates to computer systems, and more particularly to a method of maintaining quality-of-service standards in a distributed computing system.

Description of the Related Art

Computing systems have become significantly more complex over the years. In the early days of computing, there was a single computer that would handle all tasks relating to a project. As more ancillary systems have arisen and with the advent of network computing, particularly the Internet, much of the computing world is turning to distributed computing. Distributed computing, or a distributed system, is a system whose components are implemented at different locations, such as different networked computers. Examples include peer-to-peer networks, online games, telephony, and data management.

Data management is generally technology relating to the procurement, maintenance and use of data, i.e., information. The data itself may be something as simple as customer details such as names and addresses, or more extensive as is the case with financial services, for example, a financial crimes investigation solution. Operational management of data in such systems is very complicated. This challenge is especially true in systems that use distributed functional processing architectures like microservices. Microservices are a software development technique that allows structuring of an application as a collection of loosely coupled services. One benefit of decomposing an application into different smaller services is that it improves modularity, making the application easier to understand, develop, test, and become more resilient to architecture erosion. Microservices can be thought of as discrete processes that communicate over a network to fulfill any goal, particularly using technology-agnostic protocols such as hypertext transfer protocol (HTTP).

The nature of the particular microservices used depends heavily upon the application. In a financial services fraud detection application for example, microservices might include: a receive service that places transactions in queues; an attachment processor service that checks for any attachment and, if one exists, sends it to an another microservice such as an optical character recognition service; a context creator service that analyzes the current transaction and associates it with any past transactions that are related to it; a decision execution engine that carries out rules that have been set up by the client to identify violations; an analytics engine that reviews transactions and flag any outliers; a case manager service that decides whether to create a case for human follow-up based on any identified issues; and a notification manager that passes updates on the processing of each transaction back to the client's expense/procurement system.

As is true with all computing systems, it is important to be able to monitor distributed computing systems to ensure they meet quality-of-service (QoS) requirements. QoS is a measurement of the overall performance of a service, such as a telephony or computer network, or a cloud computing service, particularly the performance seen by the users of the network. To quantitatively measure quality-of-service, several related aspects of the network service are often considered. As with microservices, the specific nature of the QoS requirements depends on the particular application involved. QoS criteria may be set out in a service level agreement identifying for example response time requirements based on data types and contextual qualifications including time and data qualifications.

SUMMARY OF THE INVENTION

The present invention in at least one embodiment is generally directed to a method of assessing resource needs to meet quality-of-service criteria for a distributed processing system, by training a cognitive system with historical information on previous operation of the distributed processing system, the historical information including historical operational factors of the distributed processing system correlated with historical operational outcomes relative to the quality-of-service criteria, receiving current operational factors of the distributed processing system, and using the cognitive system to generate a predicted operational outcome of the distributed processing system based on the current operational factors, the predicted operational outcome providing an indication that a particular one of the quality-of-service criteria will not be met. The historical operational factors can include temporal information reflecting peak usages times, resource availability, customer information, transaction load, and network traffic. The historical operational outcomes can be based on data movement parameters. In an illustrative implementation the predicted operational outcome is transmitted to a data movement optimization module which invokes one or more data backplane services as needed to advance the particular quality-of-service criteria. The data backplane services can provide feedback which is used to update the historical operational factors. The predicted operational outcome might provide an indication that multiple quality-of-service criteria will not be met with respective likelihood values, in which case the data movement optimization module prioritizes the data backplane services according to the likelihood values. In an exemplary application, the distributed processing system provides a fraud detection solution wherein the quality-of-service criteria include at least resource allocations, data integrity specifications, and service uptime.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
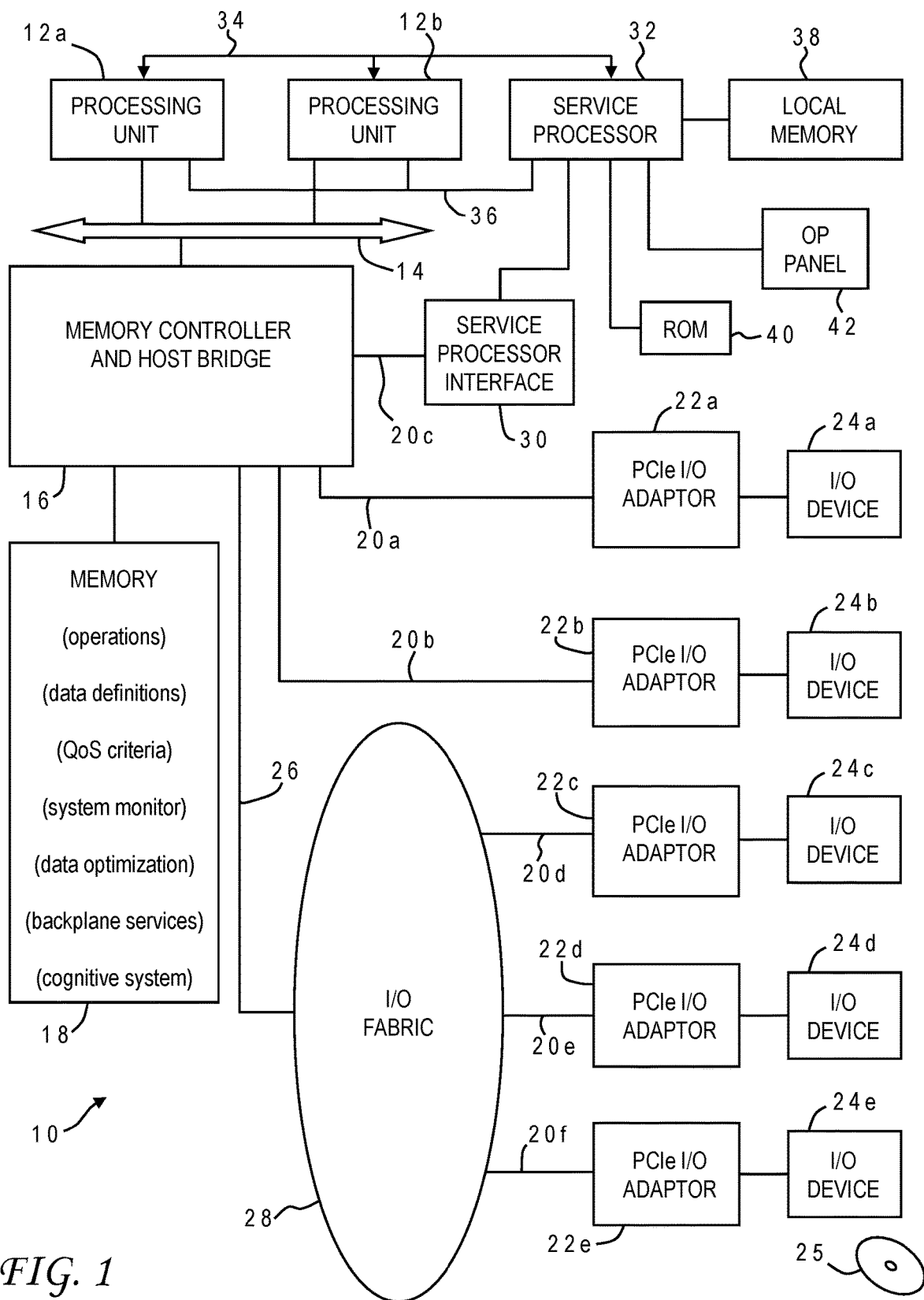
FIG. 1 is a block diagram of a computer system programmed to carry out automated operational data management dictated by quality-of-service criteria in accordance with one implementation of the present invention.

Although distributed computing and the use of microservices offer several advantages, this approach also presents new problems for the system designer. Historically monolithic applications could run as a single large-functions unit, and access data that could be optimized for minimal data movement and replication. The data could easily exist in a single common data store, it could be distributed and accessed through a federated mechanism, and it could also exist in multiple types of data structures (databases, file-based, etc.) but still allow for a data access API layer. In any of those cases, there was a consistent effort to not rely on data movement and redundancy that introduces opportunities for problems with data integrity, inconsistency, and currency.

All of these assumptions change with distributed computing systems. The difficulty is that data must often be replicated in order to utilize segmented services. For example, in a financial services application it is desirable to leverage a number of technology components to support a financial crimes investigation solution. That could involve for example using component technologies for associating banking transaction data as belonging to the same individual, understanding that individuals network of associates or running machine learning analytics on the data to identified potentially fraudulent behavioral patterns. Leveraging existing services for these functions is important but the designer is often confronted with the problem that those services need access to similar data records (customer information, transaction records, etc.) and they expect to get it in a specific format, residing in a specific schema, or using a specific data sore access interface to an expected data service. In those cases, the application creator does not have control on how the data is expected to be available and how to minimize data movement and replication. The problem becomes an issue for the overall solution provider to manage and, today, needs to manage that from project to project as the components may change but the problem remains.

It would, therefore, be desirable to devise an improved method of managing data in such distributed systems. It would be further advantageous if the method could be automated to meet quality-of-service (QoS) requirements peculiar to the particular systems involved. These and other advantages are achieved in various embodiments of the present invention by providing a solution to meet the needs of data movement, replication, and currency using a directed, QoS approach to defining how the system manages data movement throughout the system. The system allows the application developer to define the source and targets of specific data elements and provide QoS characteristics that show how fast the data needs to be moved (currency), what the target for consistency is (e.g., ensured consistency, eventual consistency, etc.), how the data is expected to be deleted, and where replicated data is created. The system can use a scalable infrastructure for the data movement (including updates and deletes) so that QoS targets can be met by elastic scaling of the infrastructure.

With reference now to the figures, and in particular with reference to FIG. 1, there is depicted one embodiment 10 of a computer system in which automated operational data management may be implemented in accordance with the present invention. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or software modules in accordance with the present invention, including the operational programs required to carry out the particular function of the distributed system, data definitions, QoS criteria, a system monitor, data optimization, various backplane services, and a cognitive system used to predict operational outcomes, all of which are explained in further detail below. While FIG. 1 shows these various components in a single memory 18, it is understood that some of these components may reside in other networked (remotely located) computer systems similar to or different from computer system 10. In particular, the backplane services can be implemented at multiple network locations remote from the data optimization.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the automated operational data management application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an automated operational data management process that uses novel optimization techniques to manage data in a distributed system. Accordingly, a program embodying the invention may additionally include conventional aspects of various data management tools, and these details will become apparent to those skilled in the art upon reference to this disclosure. Some of those tools may relate to cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Figure 2:
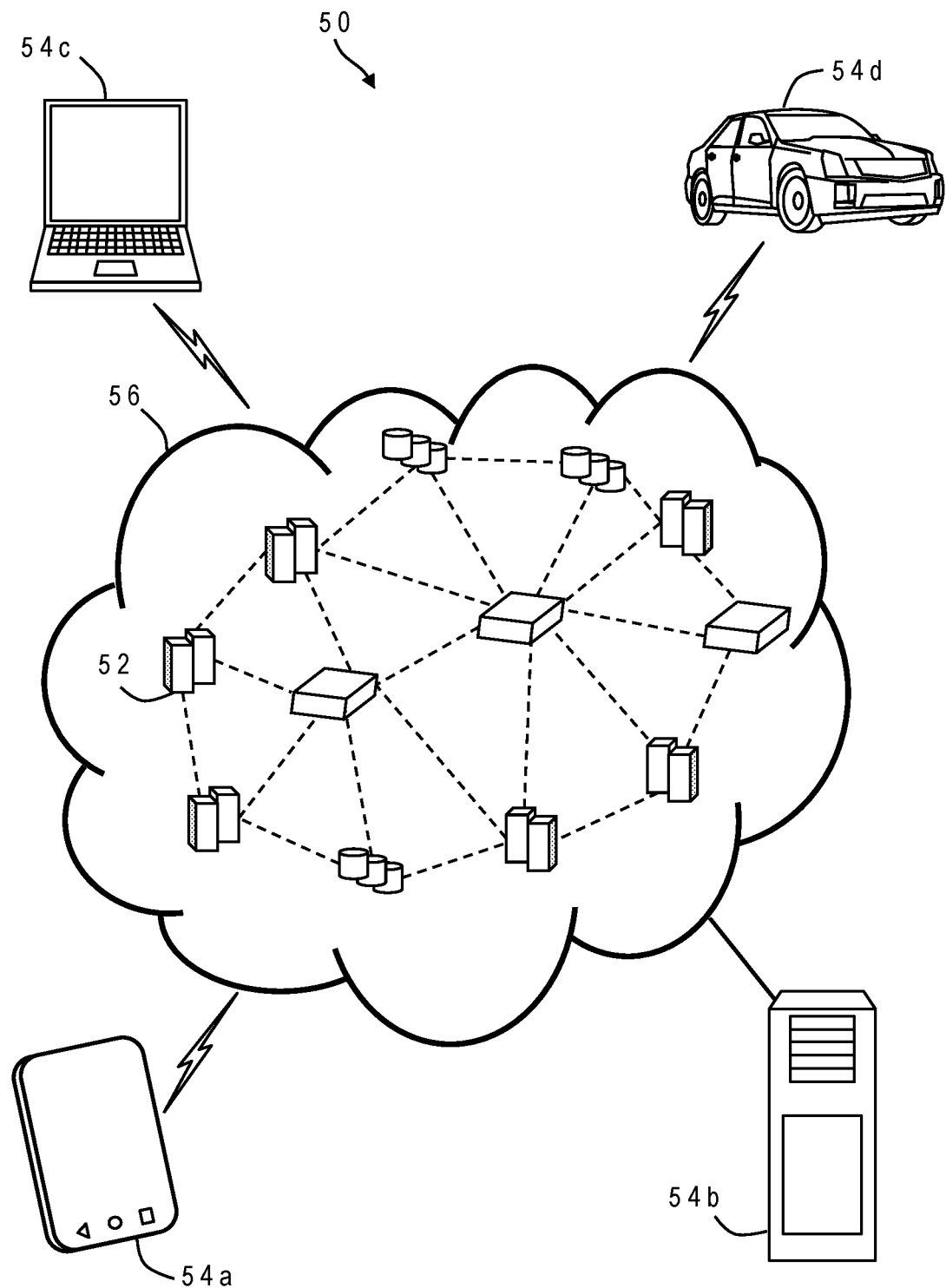
FIG. 2 is a pictorial representation of a cloud computing environment in accordance with one implementation of the present invention.

A cloud computing environment can be service-oriented with a focus on statelessness, low coupling, modularity, and semantic interoperability. At the heart of cloud computing is an infrastructure that includes a network of interconnected nodes. An illustrative cloud computing environment 50 is depicted in FIG. 2. As shown, cloud computing environment 50 includes one or more cloud computing nodes 52 in a network 56 with which local computing devices used by cloud consumers, such as, for example, personal digital assistant (PDA) or cellular telephone 54a, desktop computer 54b, laptop computer 54c, and/or automobile computer system 54d may communicate. Nodes 52 may communicate with one another as well. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54a-54d shown in FIG. 2 are intended to be illustrative only and that computing nodes 52 and cloud computing environment 50 can communicate with any type of computerized device over any type of network and/or network addressable connection (e.g., using a web browser).

Figure 3:
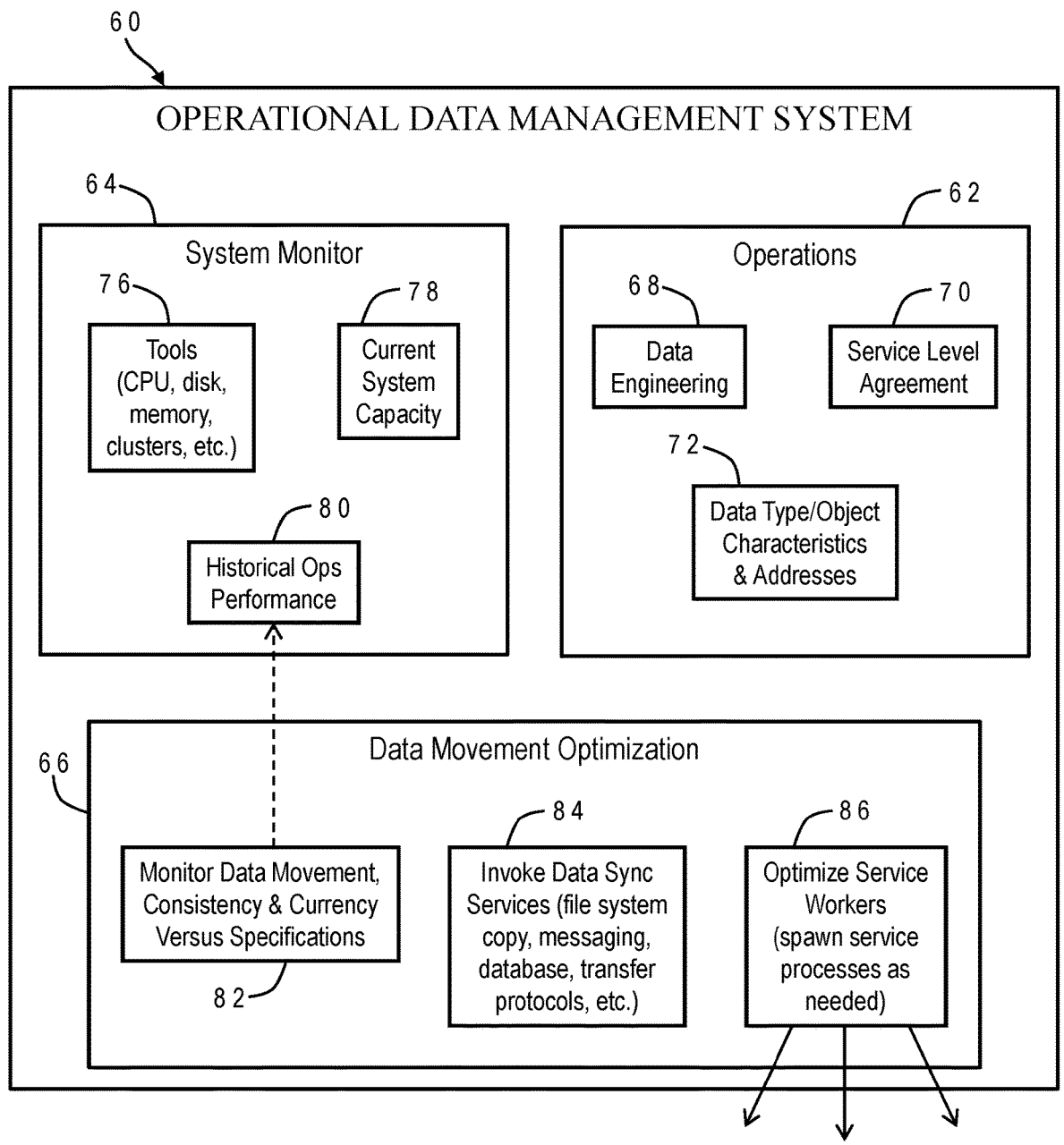
FIG. 3 is a block diagram depicting functional modules of an operational data management system in accordance with one implementation of the present invention.

Referring now to FIG. 3, there is a depicted one embodiment of an operational data management system 60 constructed in accordance with the present invention. Operational data management system 60 generally includes an operations function or module 62, a system monitor function or module 64, and a data movement optimization function or module 66. Operations module 60 includes data engineering (information engineering) 68, a service level agreement 70, and a collection of data type/object characteristics and addresses 72. Data engineering 68 comprises the workhorse of operations module 62 and involves an architectural approach for planning, analyzing, designing, and implementing applications. Its specific functions will vary according to the particular application. Service level agreement 70 is a contract between a service provider and one or more clients. Particular aspects of the service such as quality, availability and responsibilities are agreed between the service provider and the client. Service level agreements can contain numerous service-performance metrics with corresponding service-level objectives. For the financial services example, service level agreement metrics might include service availability, cost tradeoffs, and support response time. Service level agreement 70 as embodied in operations module 62 reflects the quantitative values found in the contract. Data type/object characteristics and addresses are used to describe the relevant data features for the application that apply to either data engineering 68 or service level agreement 70. Characteristics may include basic features of data types as well as more advanced features (data structures, classes, etc.). For the financial services example, specific characteristics might include structured and unstructured data, graph data, and large volumes of information requiring big data implementations with data sources and data targets having data types such as names, addresses, phone numbers, social security numbers or tax IDs or other identifying numbers. Addresses are the network locations (physical or virtual) where data is to be stored to and retrieved from, and may be of various forms depending on the protocols used (HTTP, TCP/IP, etc.).

System monitor module 64 keeps track of current and past operational performance of the components of the distributed data system. System monitor module 64 receives current information from various hardware tools 76 such as a central processing unit (CPU), disk drives or other permanent (nonvolatile) memory, volatile memory (i.e., RAM), clusters of these or other resources, etc. The information can include any parameter associated with a device, such as performance usage, allocation, power consumption, resource availability, etc. This information is used to construct a current system capacity 78. System monitor 64 also includes historical operations performance information 80, i.e., a history of device usage and capacity correlated with various parameters such as time periods (e.g., peak usage times), particular clients, or particular services.

Data movement optimization module 66 includes a separate monitor 82 which keeps track of data movement within the distributed data system, and other data performance factors such as consistency and currency, particularly relative to specifications provided by the system designer. This information can also be provided to the historical operations performance 80 of system monitor module 64. Data movement optimization module can then invoke data synchronization services 84 as needed based on the current data performance factors, as explained further below. These services may for example include file system copies, messaging, database access, transfer protocols, etc. Service workers 86 are accordingly optimized as needed.

Figure 4:
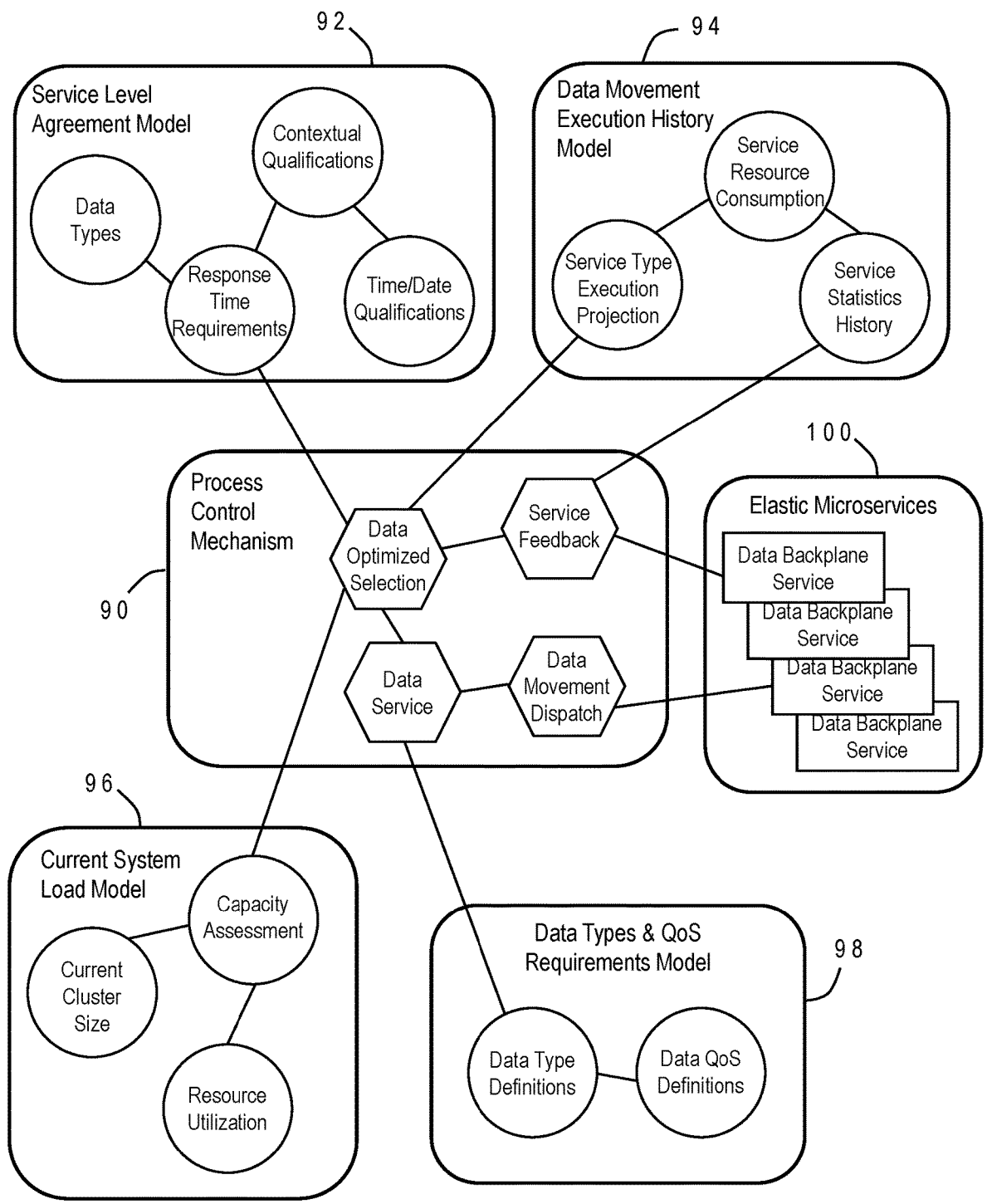
FIG. 4 is a model diagram showing one solution for automated operational data management in accordance with one implementation of the present invention which uses a service level agreement model, a data movement execution history model, a current system load model, and a data types and QoS requirements model.

In the illustrative implementation, the present invention uses different models to provide inputs used to optimize data management. As seen in FIG. 4, a process control mechanism 90 receives inputs from a service level agreement model 92, a data movement execution history model 94, a current system load model 96, and a data types and QoS requirements model 98. Any or all of these features can be embodied in computer system 10. Service level agreement model 92 provides for storing the definitions of the data sources, the targets and the associated QoS criteria for each. This model defines how the data is laid out and managed through the entire system. In general an application developer would create this definition only, then at run time the data will be moved and managed automatically by the system so the solution developer will not need to focus on that part of the system operations, and instead can focus on domain value and also have the flexibility to adopt data architecture changes without requiring infrastructural coding investment in that area. In the illustrative implementation, service level agreement model 92 includes a list of data types, contextual qualifications, time/date qualifications, and response time requirements.

Data movement execution history model 94 reflects the historical operation of data movement requests that can be used by processing control mechanism 90 to learn from past operations in order to predict current operational outcome and to make an informed assessment of how much resource needs to be applied to the work effort to meet (comply with) the criteria. As explained further below in conjunction with FIG. 5, data movement execution history model 94 can use machine learning and predictive techniques to ensure that the system is operating at optimal thresholds. In the illustrative implementation, data movement execution history model 94 includes service statistics history, service resource consumption, and service type execution projection. Current system load model 96 tracks the existing workload of the system. This information will be needed to understand the current capacity of the system and the ability to meet QoS criteria for upcoming data movement actions. A heavily loaded system may need more backplane operational threads starts to complete the work than a lightly used system with resources available. Of course this could change in real time so active monitoring and adapting is necessary. In the illustrative implementation, current system load model 96 includes resource utilization, current cluster size, and capacity assessment. Data types and QoS requirements model 98 describes characteristics about various data types and how the QoS definitions can be realized. For example, targeting real time consistency with a low latency currency requirement will differ in implementation between a relational data base, a distributed file system, block storage, etc. In the illustrative implementation, data types and QoS requirements model 98 includes data type definitions and data QoS definitions.

Process control mechanism 90 directs the elastic microservices 100 (data backplane) to invoke worker threads to meet the needs of the data to be moved. Elastic microservices 100 constitute a scalable infrastructure to actually move (update or delete) the data across heterogeneous system components and technologies. These systems are conventional and have a variety of behavioral characteristics that are well known and can be anticipated. A data backplane service is a mechanism for communication of data in a data architecture. An example of this would be Apache's Kafka. Kafka is an open-source stream-processing software platform that provides a unified, high-throughput, low-latency communications mechanism for handling real-time data feeds. Data backplane services for a fraud detection solution might include such messaging interfaces, application program interfaces (APIs), streams, or other vehicles for data communication. Elastic scaling refers to the ability to dynamically size up or down the infrastructure depending on demand, i.e., increase or decrease resources such as physical disk space, memory, CPU, etc., depending on the needs of the application at a particular moment in time.

In the illustrative implementation, process control mechanism 90 includes data optimized selection, a data service, service feedback, and a data movement dispatch. The data optimized selection receives the response time requirements from service level agreement model 92 and selects the order of services to be handled by the data service. The data service receives the data type and QoS definitions from data types and QoS requirements model 98 and determines which backplane services are appropriate for the particular data types. The data service can then order the data movement dispatch to initiate the necessary data backplane services. The data backplane services provide feedback to the service feedback of process control mechanism 90, which can also update the service statistics history in data movement execution history model 94.

In the preferred implementation, the predictive function of data management system is embodied in a novel cognitive system. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Figure 5:
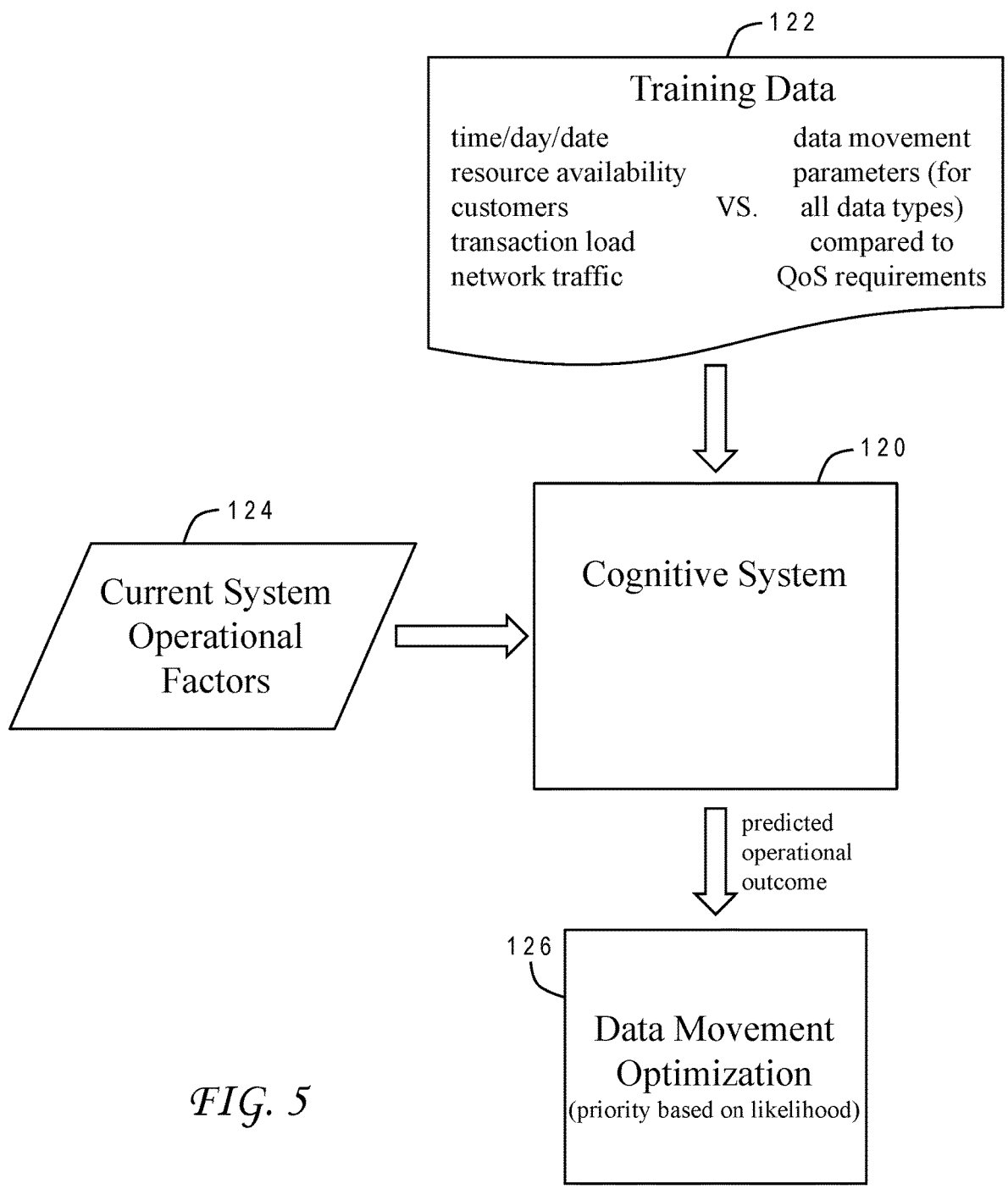
FIG. 5 is a block diagram of a cognitive system used to predict operational outcomes for the operational data management system of FIG. 3 in accordance with one implementation of the present invention.

FIG. 5 shows how a novel cognitive system 120 might be trained and applied in accordance with one implementation of the present invention. The predictive function of cognitive system 120 is based on historical information used as training data 122. In this example, the cognitive system is used to provide ongoing operational outcomes for a financial services application providing a fraud detection solution. Training data 122 thus constitutes prior examples of operational factors in different situations with actual outcomes regarding QoS requirements. For example, training data 122 can include temporal information (time of day, day(s) of the week, dates of the month or other calendar dates, etc.) reflecting peak usages times or lulls in activity, snapshots of resource availability, particular customers being service (or just the number of customers), transaction load (i.e., how many transactions have recently been requested or are currently in process), and network traffic over communication lines used by the operational system. Each data point in training data 122 can include this and other information, correlated with data movement parameters (for all data types) as compared to QoS requirements. In other words, a data point will provide the input factors that result in a given data management state where some QoS requirements are being met while others are not (a historical operational outcome). This training teaches cognitive system 120 the likelihood that certain QoS requirements will not be met for a given operational situation. The historical operational factors can be updated with the service feedback from the data backplane services.

Once cognitive system 120 has been so trained, it can be used by the operational data management system to predict likely behaviors based on current factors. The current system operational factors 124 are fed to cognitive system 120; these factors will include the same types of inputs (temporal, resources, etc.) as the training data. With the specific machine learning algorithms implemented in cognitive system 120, the predicted operational outcome can be forwarded to the data movement optimization 126 of the data management system. Further to the fraud detection example, the cognitive system might provide indications that any or all of the computational, resource, data allocation, or service uptime requirements are likely to become compromised now or in the near future. Data movement optimization 126 can then prioritize the data backplane services needed to more effectively handle these deficiencies based on the particular QoS requirements compromised. In one implementation, the predicted operational outcome can assign different values (based on confidence values generated by the cognitive system that a given QoS criterion will not be met) indicating the likelihood of QoS failure in quantitative form, and data movement optimization 126 can prioritize the services associated with the requirements that are indicated as most likely to fail, i.e., first invoking those services and/or providing more of those services to a QoS criterion having a higher likelihood of failure.

Figure 6:
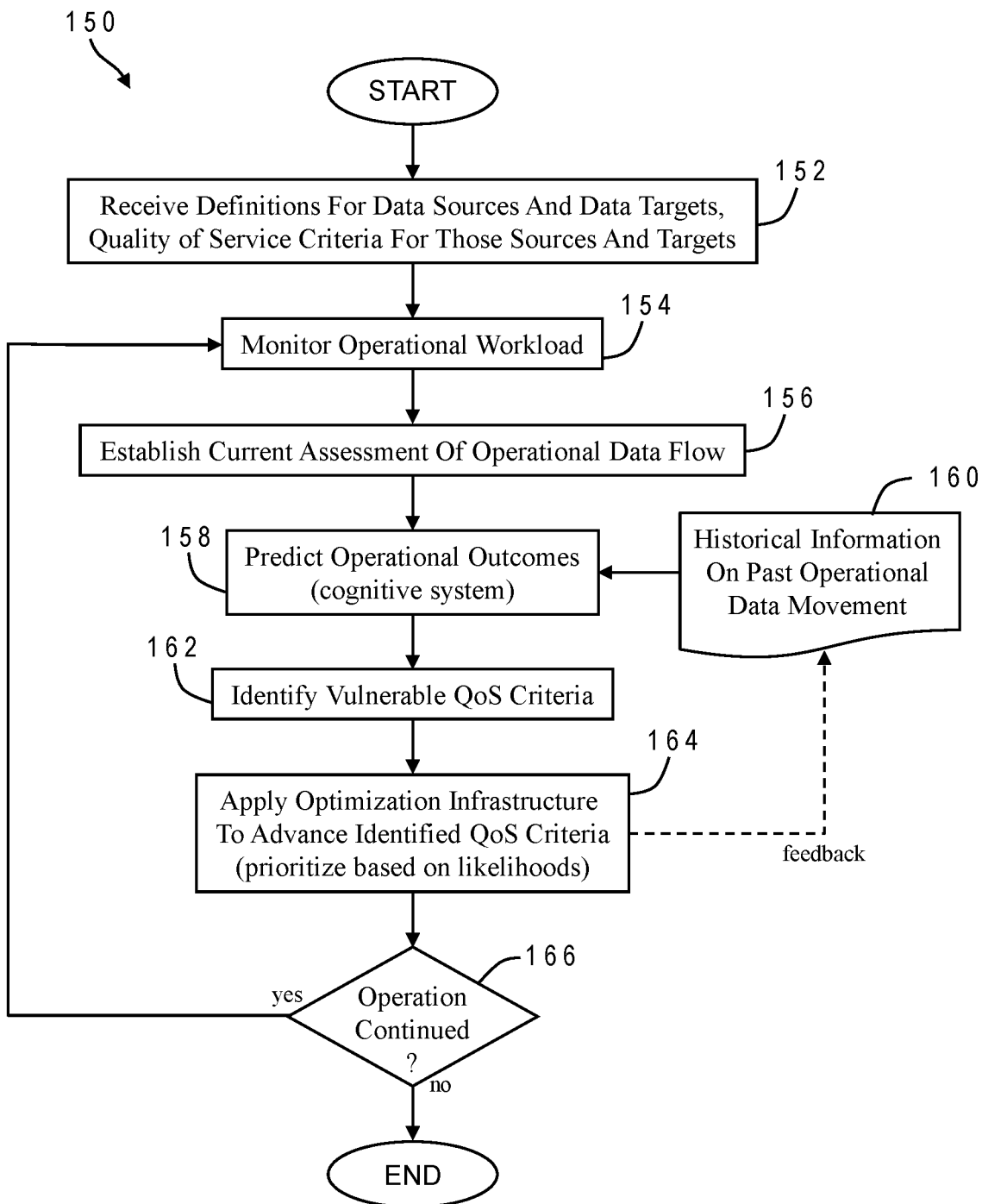
FIG. 6 is a chart illustrating the logical flow for a data management process in accordance with one implementation of the present invention.

The present invention may be further understood with reference to the chart of FIG. 6 which illustrates the logical flow for a data management process 150 in accordance with one implementation. Process 150, which may be carried out on any computer system including computer system 10 or a distributed system, begins by receiving the data definitions for sources and targets as well as the quality-of-service criteria for those sources and targets 152. The definitions can be provided by an application developer according to the particular coding and variables used. The data management system continuously monitors operational workload 154. Factors monitored can for example include resource usage, capacity, and response time. A current assessment is thereby established for the in-progress operational data flow 156. The current assessment is used to predict imminent operational outcomes 158. These outcomes can be identified by a cognitive system using historical information on past operational data movement 160. The predicted outcomes allow the data movement optimization to identify which QoS criteria are at risk 162. Some QoS criteria may be at greater risk and are accordingly granted priority in allocation of resources. The data movement optimization can then apply an appropriate optimization infrastructure to advance the identified QoS criteria 164. The optimization infrastructure (data backplane services) spawn worker threads as needed to meet the QoS targets to be achieved. For as long as operations continue 166, the process returns iteratively to box 154 with continued monitoring.

The present invention thereby provides superior elasticity of the data backplane in combination with the monitoring and subsequent predictive scaling of workload to meet QoS standards such that the data backplane can dynamically adapt to the needs of the application at a particular moment in time. Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of assessing resource needs to meet quality-of-service criteria for a distributed processing system comprising:
   training a cognitive system with historical information on previous operation of the distributed processing system, the historical information including historical operational factors of the distributed processing system correlated with historical operational outcomes relative to the quality-of-service criteria;
   receiving current operational factors of the distributed processing system; and
   using the cognitive system to generate a predicted operational outcome of the distributed processing system based on the current operational factors, the predicted operational outcome providing an indication that a particular one of the quality-of-service criteria will not be met, wherein the predicted operational outcome assigns values based on confidence values generated by the cognitive system to indicate the likelihood of quality-of-service failure in quantitative form.

2. The method of claim 1 wherein the historical operational factors include at least temporal information reflecting peak usages times, resource availability, customer information, transaction load, and network traffic.

3. The method of claim 1 wherein the historical operational outcomes are based on data movement parameters.

4. The method of claim 1, wherein:
   the distributed processing system provides a fraud detection solution; and
   the quality-of-service criteria include at least resource allocations, data integrity specifications, and service uptime.

5. The method of claim 1 further comprising transmitting the predicted operational outcome to a data movement optimization module which invokes one or more data backplane services as needed to advance the particular quality-of-service criteria.

6. The method of claim 5 wherein the data backplane services provide feedback which is used to update the historical operational factors.

7. The method of claim 5 wherein:
the predicted operational outcome provides an indication that multiple quality-of-service criteria will not be met with respective likelihood values; and
the data movement optimization module prioritizes the data backplane services according to the likelihood values.

8. A computer system comprising:
one or more processors which process program instructions;
a memory device connected to said one or more processors; and
program instructions residing in said memory device for assessing resource needs to meet quality-of-service criteria for a distributed processing system by training a cognitive system with historical information on previous operation of the distributed processing system, the historical information including historical operational factors of the distributed processing system correlated with historical operational outcomes relative to the quality-of-service criteria, receiving current operational factors of the distributed processing system, and using the cognitive system to generate a predicted operational outcome of the distributed processing system based on the current operational factors, the predicted operational outcome providing an indication that a particular one of the quality-of-service criteria will not be met, wherein the predicted operational outcome assigns values based on confidence values generated by the cognitive system to indicate the likelihood of quality-of-service failure in quantitative form.

9. The computer system of claim 8 wherein the historical operational factors include at least temporal information reflecting peak usages times, resource availability, customer information, transaction load, and network traffic.

10. The computer system of claim 8 wherein the historical operational outcomes are based on data movement parameters.

11. The computer system of claim 8 wherein:
the distributed processing system provides a fraud detection solution; and
the quality-of-service criteria include at least resource allocations, data integrity specifications, and service uptime.

12. The computer system of claim 8 further comprising transmitting the predicted operational outcome to a data movement optimization module which invokes one or more data backplane services as needed to advance the particular quality-of-service criteria.

13. The computer system of claim 12 wherein:
the predicted operational outcome provides an indication that multiple quality-of-service criteria will not be met with respective likelihood values; and
the data movement optimization module prioritizes the data backplane services according to the likelihood values.

14. The computer system of claim 12 wherein the data backplane services provide feedback which is used to update the historical operational factors.

15. A computer program product comprising:
a computer readable storage medium; and
program instructions residing in said storage medium for assessing resource needs to meet quality-of-service criteria for a distributed processing system by training a cognitive system with historical information on previous operation of the distributed processing system, the historical information including historical operational factors of the distributed processing system correlated with historical operational outcomes relative to the quality-of-service criteria, receiving current operational factors of the distributed processing system, and using the cognitive system to generate a predicted operational outcome of the distributed processing system based on the current operational factors, the predicted operational outcome providing an indication that a particular one of the quality-of-service criteria will not be met, wherein the predicted operational outcome assigns values based on confidence values generated by the cognitive system to indicate the likelihood of quality-of-service failure in quantitative form.

16. The computer program product of claim 15 wherein the historical operational factors include at least temporal information reflecting peak usages times, resource availability, customer information, transaction load, and network traffic.

17. The computer program product of claim 15 wherein the historical operational outcomes are based on data movement parameters.

18. The computer program product of claim 15 wherein:
the distributed processing system provides a fraud detection solution; and
the quality-of-service criteria include at least resource allocations, data integrity specifications, and service uptime.

19. The computer program product of claim 15 wherein further comprising transmitting the predicted operational outcome to a data movement optimization module which invokes one or more data backplane services as needed to advance the particular quality-of-service criteria.

20. The computer program product of claim 19 wherein:
the predicted operational outcome provides an indication that multiple quality-of-service criteria will not be met with respective likelihood values; and
the data movement optimization module prioritizes the data backplane services according to the likelihood values.

* * * * *